US012672211B1

(12) United States Patent
Barrack

(10) Patent No.: US 12,672,211 B1
(45) Date of Patent: Jun. 30, 2026

(54) PORTABLE MICROWAVE OVEN

(71) Applicant: Daniel Barrack, Hayes, VA (US)

(72) Inventor: Daniel Barrack, Hayes, VA (US)

( * ) Notice: Subject to any disclaimer, the term of this patent is extended or adjusted under 35 U.S.C. 154(b) by 796 days.

(21) Appl. No.: 18/077,304

(22) Filed: Dec. 8, 2022

(51) Int. Cl.
*F24C 7/02* (2006.01)
*H05B 6/64* (2006.01)

(52) U.S. Cl.
CPC ............. *H05B 6/6426* (2013.01); *F24C 7/02* (2013.01)

(58) Field of Classification Search
CPC ........... F24C 7/02; H05B 6/64; H05B 6/6426; H05B 6/6408; H05B 6/6414; H05B 6/664; H05B 6/80; H01R 9/11; H01R 11/00; H01R 13/7135
See application file for complete search history.

(56) References Cited

U.S. PATENT DOCUMENTS 5,369,255 A * 11/1994 Sherer ..................... A47J 47/14 219/739
D425,359 S * 5/2000 Seiz ................................ D7/351
6,759,636 B2 7/2004 Stutman
8,405,010 B2 3/2013 Van Dyke et al.
D913,029 S * 3/2021 Davis ............................. D7/351
2001/0045430 A1* 11/2001 Mawoud .............. H05B 6/6402 219/715
2008/0116198 A1* 5/2008 Frank ....................... H05B 6/80 219/678
2008/0217327 A1* 9/2008 Herrera ................ H05B 6/6426 219/719
2009/0114641 A1* 5/2009 Van Dyke ............ H05B 6/6426 219/679
2022/0125234 A1* 4/2022 Richardson ......... A47J 31/0576
2022/0210878 A1* 6/2022 Sugiyama ............ H05B 6/6414
2023/0066744 A1* 3/2023 Faualo ................... H05B 6/664
2023/0275377 A1* 8/2023 Dimitrov ............... H01H 71/04 361/42

OTHER PUBLICATIONS

One+ 18V Lithium-Ion 4.0 Ah Battery (2-Pack); Jan. 8, 2022; https://web.archive.org/web/20220108174722/https://www.homedepot.com/p/RYOBI-ONE-18V-Lithium-Ion-4-0-Ah-Battery-2-Pack-PBP2005/316767033 (Year: 2022).*

* cited by examiner

*Primary Examiner* — Justin C Dodson
(74) *Attorney, Agent, or Firm* — Sanchelima & Associates, P.A.; Christian Sanchelima; Jesus Sanchelima

(57) ABSTRACT

A portable microwave oven including a housing assembly, a microwave assembly and an electric assembly. Microwave assembly includes a microwave oven housed inside of the housing, wherein the microwave oven is actuated by means of programmable buttons placed in a front side of the housing. Electric assembly includes a plurality of batteries on each side of the housing. USB ports placed in a rear side of the housing are operatively connected to the plurality of batteries, where different electronic means can be connected. A handle on a top side of the housing allows the portable microwave oven to be easily transported. The microwave oven is capable of being powered by means of a plurality of batteries, a 12-volt male plug or a 110-volt power supply.

1 Claim, 3 Drawing Sheets

PORTABLE MICROWAVE OVEN

BACKGROUND OF THE INVENTION

1. Field of the Invention

The present invention relates to a microwave and, more particularly, to a portable microwave oven that includes microwave oven included in a housing to be carried anywhere to heat the food while a power supply is not available, it also may supply power be means of a plurality of electrical ports powered by rechargeable plurality of batteries included in the portable microwave.

2. Description of the Related Art

Several designs for microwaves have been designed in the past. None of them, however, include a housing with a microwave oven included therein, the microwave oven is actuated by programmable buttons, the housing includes a plurality of electrical ports powered by a plurality of rechargeable plurality of batteries, the plurality of batteries also supply power by means of a pigtail split power and USB ports included in the housing.

Applicant believes that a related reference corresponds to U.S. Pat. No. 8,405,010 issued for portable microwave oven with protective housing. Applicant believes that another related reference corresponds to U.S. Pat. No. 6,759,636 issued for mobile microwave oven. None of these references, however, teach of a microwave oven having a pigtail split power connection and locking tray, along with other disclosed components.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a portable microwave to heat the food when a power supply is not available.

It is another object of this invention to provide a power supply to power a plurality of electronic means.

It is still another object of the present invention to provide a device that is powered and/or rechargeable by means of a 12-volts car supply or a 110-volts power supply.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
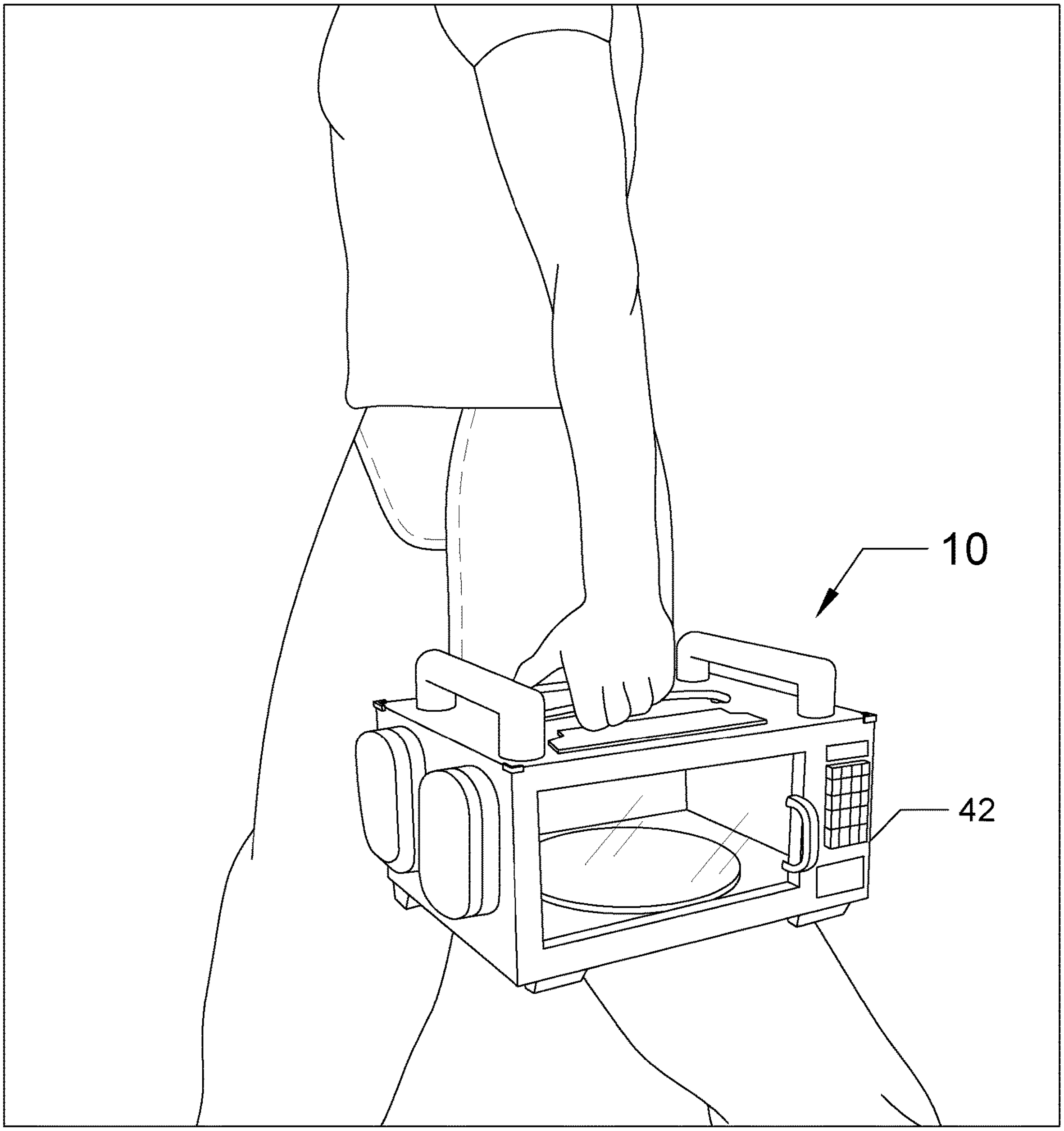
FIG. 1 represents an operational view of an exemplary embodiment of the present invention 10.

Referring now to the drawings, where the present invention is generally referred to with numeral 10, it can be observed that it basically includes a housing assembly, a microwave assembly and an electric assembly. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 2:
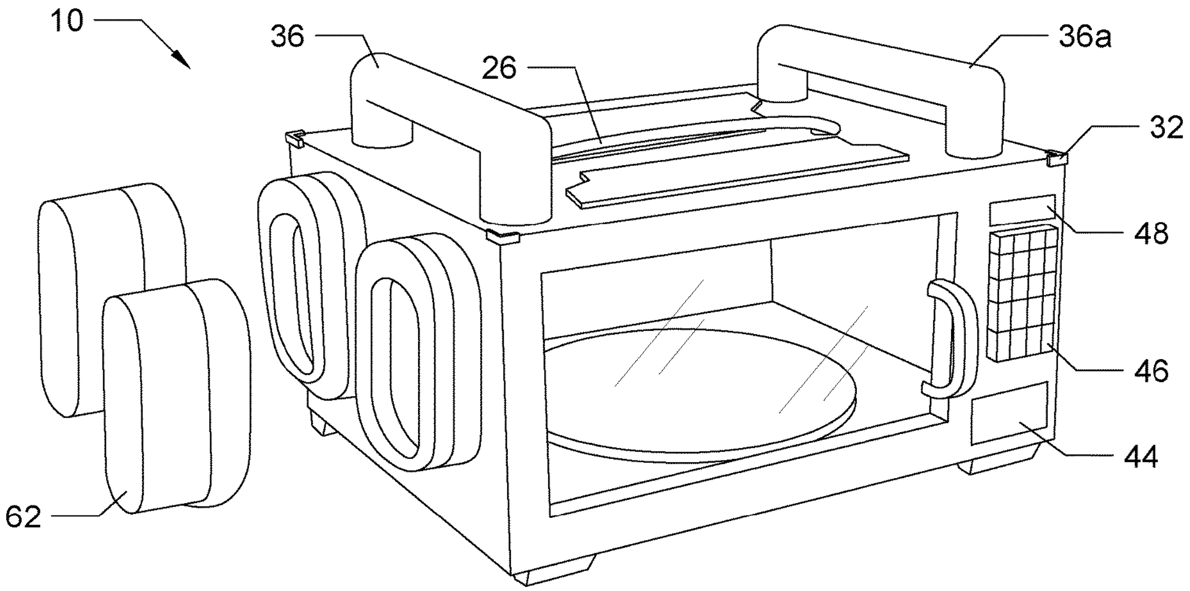
FIG. 2 shows an isometric view of the housing assembly 20 while the microwave oven is opened and the handle 26 is in a recessed position.
Figure 4:
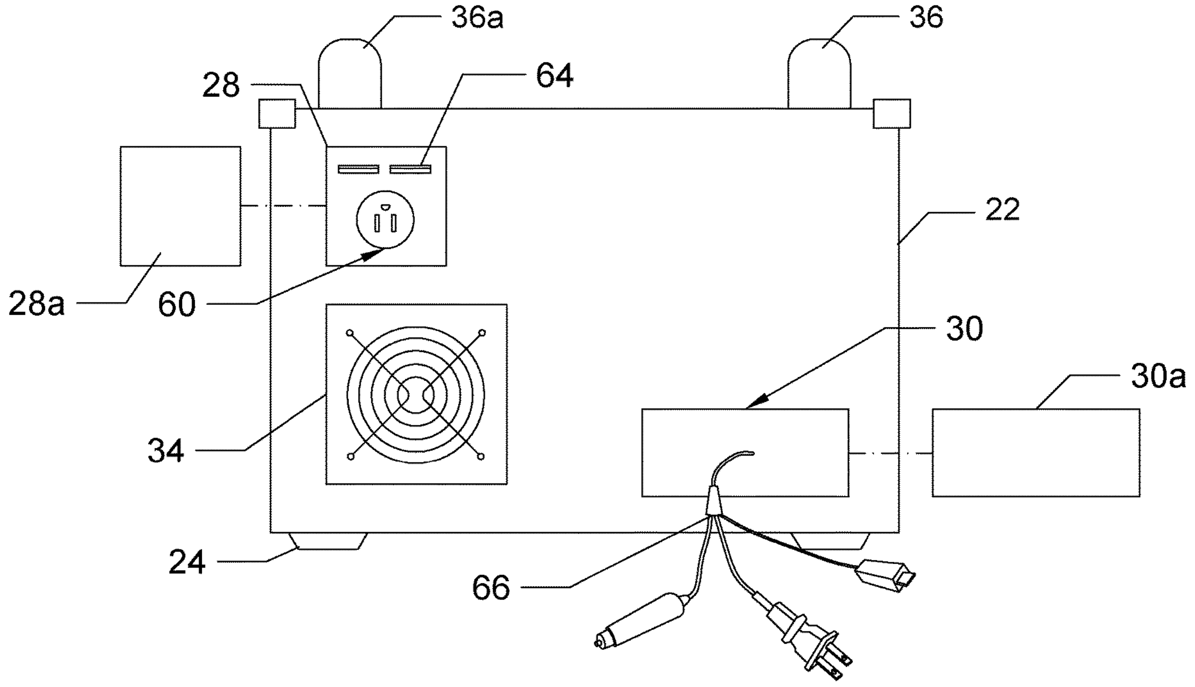
FIG. 4 is a representation of a rear view of the present invention 10, wherein the electric plug 68 and the USB ports 64 are housed inside of the inlet compartment 28 and protected by an inlet cover 28*a* and pigtail split power is housed inside the outlet compartment 30 and protected by the outlet cover 30*a*.

Housing assembly 20 includes a housing 22, legs 24, a handle 26, an inlet compartment 28, an inlet cover 28*a*, an outlet compartment 30, an outlet cover 30*a*, protective corners 32 and a cooling fan 34. In an exemplary embodiment, housing 22 may have a cuboid shape, wherein the housing 22 may have a hollow body where electronic circuitry may be housed inside of the housing 22. In a suitable embodiment, the housing 22 may be made of stainless steel, alloy steel or any other variation thereof. In a suitable embodiment, the legs 24 may have attached to the bottommost edge of the housing 22, wherein the legs are placed along the bottommost edge of the housing 22. In one embodiment, the legs 24 are made of rubber, hard plastic, aluminum, silicone, or any other suitable material. In a suitable embodiment, legs 24 may have a trapezoidal prism shape, nevertheless a cube shape, a cuboid shape, a spherical shape, or any other variation may be suitable for the legs 24. The legs 24 creates a gap between the bottom side of the housing 22 and a surface, allowing the air flow underneath the housing 22. The housing 22 further includes a stack member 36 and a plurality of stack member 36*a* in a top side thereof, wherein the stack member 36 may have a tubular shape with curved edges attached proximal to the lateral edge of a top side portion of the housing 22. In a suitable embodiment, the legs 24 may have a threaded portion attached to the bottommost edge of the housing 22, wherein a portion of the legs are placed inside of the housing 22 and the opposite edge includes a rubber base, wherein the legs 24 may level the housing to a horizontal plane by means of the threaded portion of the legs 26. The plurality of stack member 36*a* may be symmetrical to the stack member 36 and attached to the opposite edge with respect to said stack member 36. In a preferred embodiment, a handle 26 may be attached on the top side of the housing 22. In one embodiment, the handle 26 may have an ergonomic shape for a user's hand while being carried. As shown in FIG. 1. The handle 26 may be attached by means of its edges to the housing 22. In a preferred embodiment, the top side of the housing 22 may include a recessed handle for stackable capabilities on top of the housing 22, wherein the top side of the housing 22 further includes receiving portions, as shown in FIG. 2, allowing the receiving portion to contain tool, devices or the like. In other embodiment, an inlet compartment 28 is placed in a rear side of the housing 22, where inside the inlet compartment 28 is placed an electric plug 68 and USB ports 64 well known in prior art. The elements contained inside the inlet compartment 28 are protected by an inlet cover 28*a*, wherein the inlet cover 28 may be removably attachable by means of fasteners and/or a lock tab or any other locking mechanism known in the art. Nevertheless, it should be considered that the inlet cover 28*a* may be hingedly attached to the inlet compartment 28, thereby the inlet cover 28*a* may be configured to be opened to reach the electric plug 68 and/or USB ports 64 or to be closed to protect said elements. In one embodiment, the outlet compartment 30 is placed in a rear side of the housing 22, where inside the outlet compartment 30 is placed an electric pigtail split power 66. The elements contained inside the outlet compartment 30 are protected by an outlet cover 30, wherein the outlet cover 30*a* may be removably attachable by means of fasteners and/or a lock tab or any other locking mechanism known in prior art. Nevertheless, it should be considered that the outlet cover 30*a* may be hingedly attached to the outlet compartment 30, thereby the outlet cover 30*a* may be configured to be opened to reach the pigtail split power 66 or to be closed to protect said elements. In other embodiment, the cooling fan 34 may be attached in an internal side of the rear side of the housing 22, wherein the cooling fan 34 allows for proper cooling of a microwave oven 42 and keeps the circuitry cool during every oven function, thereby the cooling fan 34 extracts heated air from the interior of the housing 22 by means of an aperture placed on a rear side of the housing 22 to the exterior, wherein the cooling fan 34 is protected by means of a fan guard made of metal or any other suitable material. As best depicted in FIG. 4. In a suitable embodiment, protective corners 32 may be placed on each corner of the top side of the housing 22, wherein the protective corners 32 be made of foam, steel, aluminum, polyurethane, or any other suitable material that provides impact resistance. As illustrated in FIG. 2.

Microwave assembly 40 includes a microwave oven 42, a pressing button 44, a plurality of programmable buttons and a display 48. In an exemplary embodiment, the microwave oven 42 may be housed inside the housing 22, wherein the microwave oven includes a door in a front side of the housing and the door is hingedly attached to the front side of the housing and actuated by means of the pressing button 44 in order to reach the heating portion of the microwave oven 42. In a suitable embodiment, the pressing 44 button may have a rectangular shape, a circular shape, a regular shape, an irregular shape or any other variation thereof. Pressing button 44 may have a spring-loaded mechanism that allows the pressing button 44 to be pressed in order to open the door and return to its original position when the stop pressing thereof. In a preferred embodiment, pressing button 44 may be placed in a portion of the front side of the housing 22. In a suitable embodiment, the plurality of programmable buttons 46 is placed in a front portion of the housing 22, wherein the plurality of programmable buttons 46 may be made of rubber, plastic, silicone, or any other suitable material. The plurality of programmable buttons 46 may actuate the microwave oven 42, thereby each button of the plurality of programmable buttons 46 may have a predetermined configuration that may control the power and time of the microwave oven 42 to start heating a predetermined food. In different exemplary embodiments of the present invention 10 said programmable buttons 46 may cause the microwave oven 42 to heat up dinner, popcorn, beverage or the like. In one embodiment, the display 48 may be placed in a portion of the front side of the housing, wherein the display 48 counts the remaining time of the microwave oven operation. It should be considered that the display 48 may show the actual time even while the plurality of batteries 62 is discharged by means of plurality of batteries well known in the art operatively connected to the display 48. It should be considered that the display 48 may indicate the current time. In an exemplary embodiment the internal portion of the microwave oven 42 may be illuminated when opening the door and/or while heating up the food. It should be considered that the programmable buttons 46 may be lighted up while the door of the microwave oven 42 is opened and/or closed (not shown in the drawing).

Figure 3:
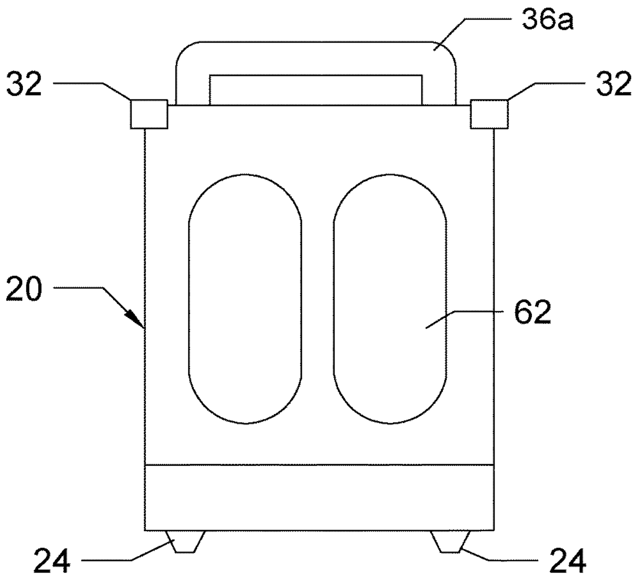
FIG. 3 illustrates a side view of the present invention 10, wherein the plurality of batteries 62 are placed on each lateral side of the housing assembly 20.

Electric assembly 60 includes a plurality of batteries 62, USB ports 64, a pigtail split power 66 and an electric plug 68. In an exemplary embodiment, the plurality of batteries 62 may be placed on the lateral sides of the housing 22, As best depicted in FIG. 3, wherein the plurality of batteries may have a suitable voltage and current to power the microwave oven 42. In a preferred embodiment, the plurality of batteries 62 may be plurality of batteries well known in prior art. The plurality of batteries 62 may be removably attachable to the housing 22*b* by means of a plurality of chargers attached to the laterals of the housing 22, wherein the chargers recharge the plurality of batteries by connecting a 110-volt plug connector to a residential voltage. Nevertheless, it should be considered that the plurality of batteries 62 may be recharged by means of an external charger. In one embodiment, USB ports 64 may be type A, nevertheless, a type B, type C, a mini-A or any other variation thereof may be considered. In other embodiment, pigtail split power 66 may include a 12-volt male plug, the 110-volt plug and a USB male plug. As best illustrated in FIG. 4. Nonetheless, it should be considered that pigtail split power 66 may include other variations of plugs and/or ports. In a suitable embodiment, the electric plug 68 may be a 12-volt male plug for automobile auxiliary power outlet size A, size B or any other variation thereof. It should be considered that the electric plug 68 be operatively connected to the automobile auxiliary power outlet, thereby, the microwave assembly 40 may be powered by means of the vehicle's electrical system.

Referring to FIG. 1, the present invention 10 may be portable, wherein may be carried to a predetermined location while carrying by means of the handle 26. The microwave oven 42 may heat a predetermined food by pressing the predetermined programmable buttons 46 to actuate the microwave oven with a predetermined time and power. It should be considered that the present invention 10 may power a plurality of external devices by means of the electric assembly 60.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

The portable microwave oven, also termped as present invention 10, consists of a housing assembly including a housing, legs, a handle, an inlet compartment and an outlet compartment, wherein said housing has a cuboid shape, said handle is recessed within a top portion of said housing, said inlet compartment is placed in a rear portion of said housing, said outlet compartment is placed in a rear portion of said housing, said legs are attached to a bottommost edge of said housing, said legs permits an air flow underneath said housing, said legs have a trapezoidal prism shape, said legs are made of hard plastic, said legs are placed proximal on each corner of said housing, said legs allows said housing to be leveled in a horizontal plane, said housing assembly further includes a first stack member and a second stack member attached on a top portion of said housing, wherein each of said first stack member and second stack member have a tubular shape with curved edges, wherein said first stack member is attached proximal to a lateral edge of said top side portion of said housing and wherein said second stack is attached to an opposite edge with respect to said first stack member, said inlet compartment and said outlet compartment includes a cover removably attachable respectively; a microwave assembly having a microwave oven, a pressing button, programmable buttons, and a display, wherein said microwave oven is housed inside said housing, said pressing button is configured to open a door of said microwave oven, said pressing button has a spring-loaded mechanism that returns to its original position when stop pressing, said door includes a handle positioned in a vertical position, said handle is attached proximal to a lateral end of said door, said microwave oven is actuated by means of said programmable buttons, said programmable buttons actuate said microwave oven in a predetermined time and power; and an electric assembly including a plurality of batteries, USB ports and a pigtail split power, wherein said plurality of batteries are operatively connected to said microwave oven, said USB ports is powered by said plurality of batteries, wherein said plurality of batteries are removably attachable to said housing, plurality of batteries are operatively connected to said microwave oven, said plurality of batteries are removably attachable to said housing, said plurality of batteries are rechargeable by means of a plurality of chargers attached to each lateral side of said housing, wherein said chargers are operatively connected to said USB ports and to a USB plug included in said pigtail split power.

What is claimed is:

1. A portable microwave oven, consisting of:

a housing assembly including a housing, legs, a handle, an inlet compartment and an outlet compartment, wherein said housing has a cuboid shape, said handle is recessed within a top portion of said housing, said inlet compartment is placed in a rear portion of said housing, said outlet compartment is placed in the rear portion of said housing, said legs are attached to a bottommost edge of said housing, said legs permits an air flow underneath said housing, said legs have a trapezoidal prism shape, said legs are made of hard plastic, said legs are placed proximal on each corner of said housing, said legs allows said housing to be leveled in a horizontal plane, said housing assembly further includes a first stack member and a second stack member attached on a top portion of said housing, wherein each of said first stack member and second stack member have a tubular shape with curved edges, wherein said first stack member is attached proximal to a lateral edge of said top side portion of said housing and wherein said second stack is attached to an opposite edge with respect to said first stack member, said inlet compartment and said outlet compartment includes a cover removably attachable respectively;

a microwave assembly having a microwave oven, a pressing button, programmable buttons, and a display, wherein said microwave oven is housed inside said housing, said pressing button is configured to open a door of said microwave oven, said pressing button has a spring-loaded mechanism that returns to its original position when stop pressing, said door includes a handle positioned in a vertical position, said handle is attached proximal to a lateral end of said door, said microwave oven is actuated by means of said programmable buttons, said programmable buttons actuate said microwave oven in a predetermined time and power; and an electric assembly including a plurality of batteries, USB ports and a pigtail split power, wherein said plurality of batteries are operatively connected to said microwave oven, said USB ports is powered by said plurality of batteries, wherein said plurality of batteries are removably attachable to said housing, plurality of batteries are operatively connected to said microwave oven, said plurality of batteries are removably attachable to said housing, said plurality of batteries are rechargeable by means of a plurality of chargers attached to each lateral side of said housing, wherein said chargers are operatively connected to said USB ports and to a USB plug included in said pigtail split power.

* * * * *